US008634432B2

United States Patent
Khan et al.

(10) Patent No.: US 8,634,432 B2
(45) Date of Patent: Jan. 21, 2014

(54) SYSTEM AND METHOD FOR SUBCARRIER ALLOCATION IN A MULTICARRIER WIRELESS NETWORK

(75) Inventors: Farooq Khan, Allen, TX (US); Cornelius van Rensburg, Dallas, TX (US); Jiann-An Tsai, Richardson, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 1324 days.

(21) Appl. No.: 11/389,708

(22) Filed: Mar. 27, 2006

(65) Prior Publication Data

US 2006/0250938 A1  Nov. 9, 2006

Related U.S. Application Data

(60) Provisional application No. 60/678,283, filed on May 6, 2005.

(51) Int. Cl.
*H04B 1/02* (2006.01)
(52) U.S. Cl.
USPC .......................... 370/431; 370/328; 455/104
(58) Field of Classification Search
USPC ......... 370/203, 204, 310, 315, 329, 339, 431, 370/439; 455/73, 103, 104
See application file for complete search history.

(56) References Cited

U.S. PATENT DOCUMENTS

| | | | |
|---|---|---|---|
| 7,058,367 B1* | 6/2006 | Luo et al. ........................ | 455/101 |
| 7,388,847 B2* | 6/2008 | Dubuc et al. ................... | 370/329 |
| 2003/0128658 A1* | 7/2003 | Walton et al. .................. | 370/208 |
| 2003/0165189 A1* | 9/2003 | Kadous .......................... | 375/225 |
| 2003/0235147 A1* | 12/2003 | Walton et al. .................. | 370/204 |
| 2004/0131007 A1* | 7/2004 | Smee et al. ..................... | 370/208 |
| 2004/0184398 A1* | 9/2004 | Walton et al. .................. | 370/203 |
| 2004/0190484 A1* | 9/2004 | Shin et al. ...................... | 370/347 |
| 2004/0229615 A1* | 11/2004 | Agrawal ......................... | 455/436 |
| 2005/0283715 A1* | 12/2005 | Sutivong et al. ............... | 714/790 |
| 2006/0039496 A1* | 2/2006 | Chae et al. ..................... | 375/267 |
| 2006/0109923 A1* | 5/2006 | Cai et al. ........................ | 375/260 |
| 2006/0146755 A1* | 7/2006 | Pan et al. ....................... | 370/334 |
| 2006/0146760 A1* | 7/2006 | Khandekar et al. ............ | 370/335 |
| 2006/0203792 A1* | 9/2006 | Kogiantis et al. .............. | 370/343 |
| 2006/0209669 A1* | 9/2006 | Nishio ............................ | 370/208 |

* cited by examiner

*Primary Examiner* — Michael Thier
*Assistant Examiner* — Curtis A Alia

(57) ABSTRACT

A base station for use in an OFDM network capable of communicating with a plurality of subscriber stations in a coverage area of the OFDM network. The base station transmits to a first subscriber station in a first subband of subcarriers from a first transmit antenna and transmits to the first subscriber station in a second subband of subcarriers from a second transmit antenna. The first and second subbands comprise different subcarriers. The base station also transmits to a second subscriber station in the first subband of subcarriers from the second transmit antenna and transmits to the second subscriber station in the second subband of subcarriers from the first transmit antenna.

25 Claims, 6 Drawing Sheets

SYSTEM AND METHOD FOR SUBCARRIER ALLOCATION IN A MULTICARRIER WIRELESS NETWORK

CROSS-REFERENCE TO RELATED APPLICATIONS AND CLAIM OF PRIORITY

The present application is related to U.S. Provisional Patent No. 60/678,283, entitled "Orthogonal Space and Frequency Access In An OFDM Wireless Communication System", filed May 6, 2005. Provisional Patent No. 60/678,283 is assigned to the assignee of the present application. The subject matter disclosed in Provisional Patent No. 60/678,283 is hereby incorporated by reference. The present application hereby claims priority under 35 U.S.C. §119(e) to Provisional Patent No. 60/678,283.

TECHNICAL FIELD OF THE INVENTION

The present disclosure relates generally to wireless communications and, more specifically, to an apparatus and method for allocating subcarriers to subscriber stations in an orthogonal frequency division multiplexing (OFDM) network or an orthogonal frequency division multiple access (OFDMA) network.

BACKGROUND OF THE INVENTION

Conventional orthogonal frequency division multiplexing (OFDM) networks and orthogonal frequency division multiple access (OFDMA) network are able to improve the reliability of the channel by spreading and/or coding data traffic and control signals over multiple subcarriers (i.e., tones). Different user devices (i.e., subscriber stations, mobile stations, etc.) are allocated different sets of subcarriers (or tones) for transmitting and receiving data and control signals. The subcarrier frequencies are orthogonal to each other, thereby minimizing interference between user devices.

OFDM techniques are particularly advantageous in multiple-input, multiple output (MIMO) wireless networks that employ multiple antennas (i.e., Smart antennas) to transmit OFDM signals to the user devices. However, in conventional MIMO techniques based on OFDM transmission, the same subband (or set of subcarriers) is allocated to a given user device from each of the transmit antennas. However, due to independent fading from each of the transmit antennas, the user device may experience different channel quality for each of the transmit antennas even for the same subband. Therefore, transmitting on the same subband from each antenna for each user devices results in less than optimal performance, because the subband selected for transmission may not be good on each of the transmit antennas.

Therefore, there is a need in the art for improved apparatuses and methods for transmitting OFDM signals from a multi-antenna OFDM transmitter to an OFDM receiver. In particular, there is a need for a multi-antenna OFDM base station that transmits to multiple user devices (e.g., subscriber stations) without suffering the performance degradation associated with independent fading of the same subband from different antennas.

SUMMARY OF THE INVENTION

In one embodiment of the present disclosure, a base station is provided for use in an orthogonal frequency division multiplexing (OFDM) network capable of communicating with a plurality of subscriber stations in a coverage area of the OFDM network. The base station is capable of transmitting to a first subscriber station in a first subband of subcarriers from a first transmit antenna and is capable of transmitting to the first subscriber station in a second subband of subcarriers from a second transmit antenna, wherein the first and second subbands comprise different subcarriers. The base station is further capable of transmitting to a second subscriber station in the first subband of subcarriers from the second transmit antenna and transmitting to the second subscriber station in the second subband of subcarriers from the first transmit antenna.

According to another embodiment of the present disclosure, a method is provided for transmitting from a base station to a first subscriber, for use in an orthogonal frequency division multiplexing (OFDM) network capable of communicating with a plurality of subscriber stations in a coverage area of the OFDM network. The method comprises the steps of: transmitting to the first subscriber station in a first subband of subcarriers from a first transmit antenna; transmitting to the first subscriber station in a second subband of subcarriers from a second transmit antenna, wherein the first and second subbands comprise different subcarriers; transmitting to a second subscriber station in the first subband of subcarriers from the second transmit antenna; and transmitting to the second subscriber station in the second subband of subcarriers from the first transmit antenna.

The method further comprises the steps of receiving in the base station from the first subscriber station: 1) first channel quality indication (CQI) data associated with a first downlink signal received from the first transmit antenna in the first subband; 2) second channel quality indication (CQI) data associated with a second downlink signal received from the second transmit antenna in the first subband; 3) third channel quality indication (CQI) data associated with a third downlink signal received from the first transmit antenna in the second subband; and 4) fourth channel quality indication (CQI) data associated with a fourth downlink signal received from the second transmit antenna in the second subband.

The method also comprises the step of selecting the first subscriber station to receive in the first subband from the first transmit antenna and to receive in the second subband from the second transmit antenna, based on the first second, third and fourth CQI data received from the first subscriber station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

The present disclosure is directed to apparatuses and algorithms for transmitting from a multiple antenna base station to a subscriber station (i.e., user device) in an orthogonal frequency division multiplexing (OFDM) wireless network. The base station uses multiple-input, multiple-output (MIMO) antennas to implement spatial division multiplexing techniques. Unlike conventional MIMO implementations, the disclosed base station may transmit to the same subscriber station from multiple antennas using different subcarriers on each antenna, depending on the fading of the subcarriers from each antenna.

Figure 1:
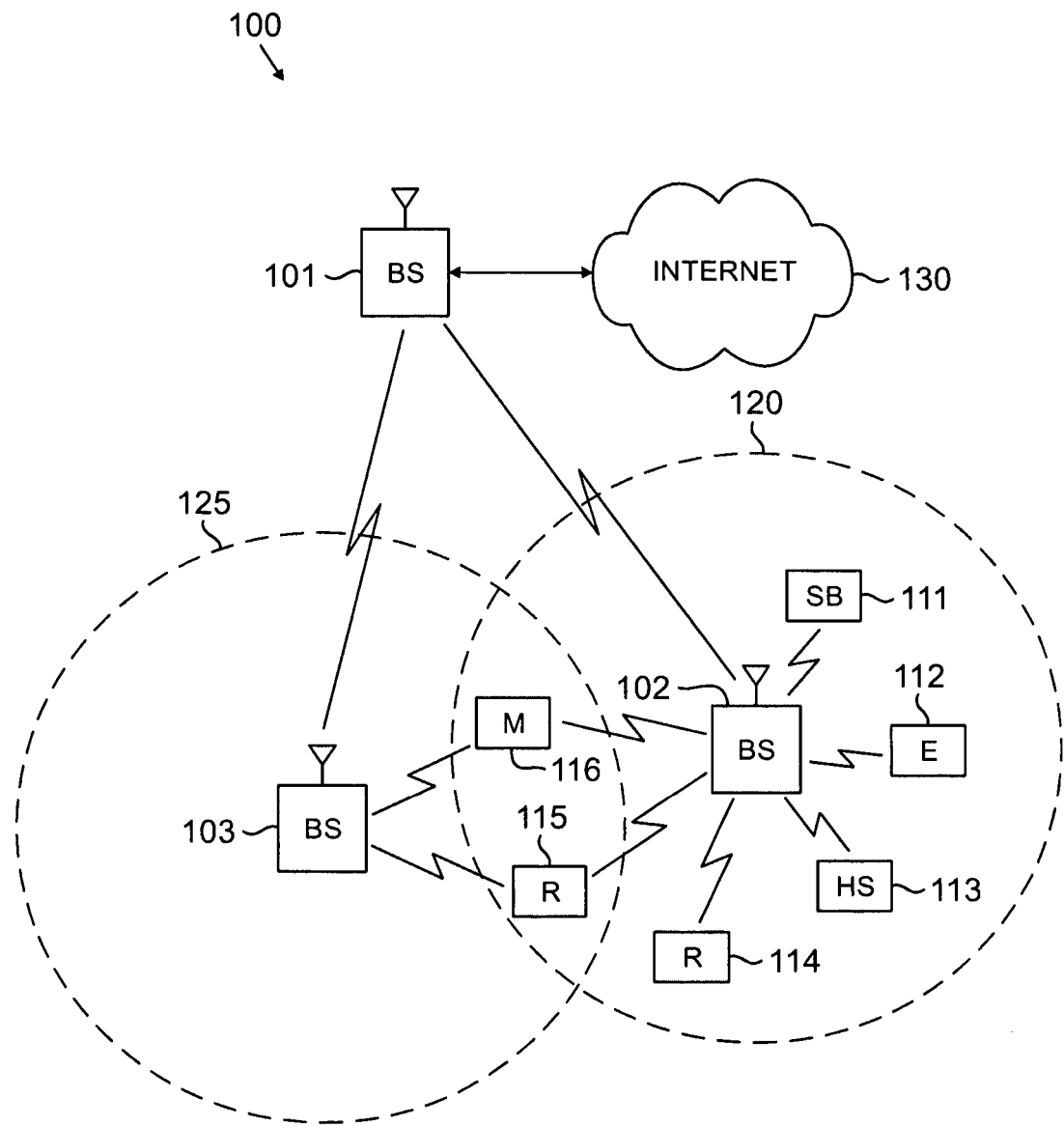
FIG. 1 illustrates an exemplary OFDM wireless network that allocates subbands to each subscriber station on an antenna-by-antenna basis according to the principles of the disclosure.

FIG. 1 illustrates exemplary orthogonal frequency division multiplexing (OFDM) wireless network 100, which allocates subbands (or groups of subcarriers) to each subscriber station on an antenna-by-antenna basis according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

In an advantageous embodiment of the present disclosure, each one of base stations 101-103 uses multiple antennas to transmit data to each subscriber station in the downlink and to receive data from each subscriber stations in the uplink. According to the principles of the present disclosure, each one of base stations 101-103 is capable of transmitting data to a selected subscriber station using one group of subcarriers (or subband) on a first antenna and a different group of subcarriers (or subband) on a second antenna. For example, BS 102 may transmit downlink data to SS 116 from a first antenna (ANT1) using a first group of 64 subcarriers (i.e., Subband1) and may simultaneously transmit downlink data to SS 116 from a second antenna (ANT2) using a second group of 64 subcarriers (i.e., Subband2). At the same time, BS 102 may transmit downlink data to SS 115 from antenna ANT1 using Subband2 and may simultaneously transmit downlink data to SS 115 from antenna ANT2 using Subband1. Since the fading at the receiver from each antenna is independent of the other antennas, the allocation of subbands at each antenna is independent of the allocations of subbands at other antennas. Thus, the allocations of subbands are done on an antenna-by-antenna basis.

Figure 2:
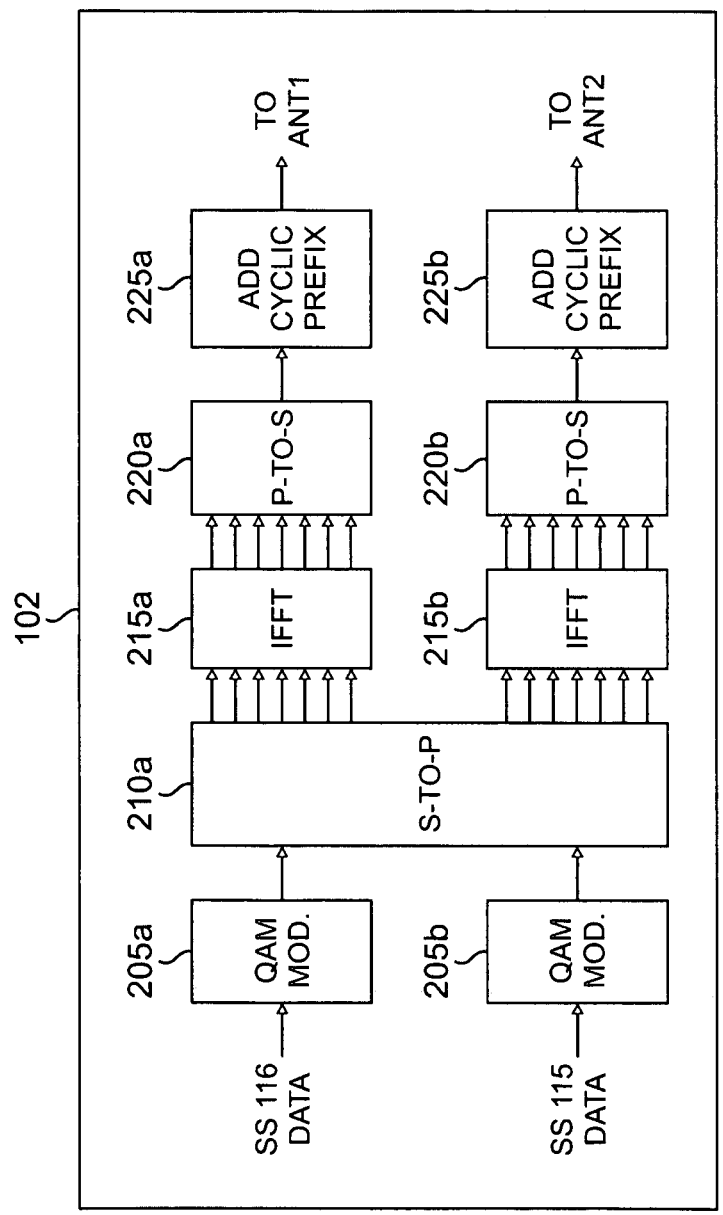
FIG. 2 is a high-level diagram of the transmit path in a base station according to one embodiment of the disclosure.

FIG. 2 is a high-level diagram of base station 102 according to an exemplary embodiment of the disclosure. BS 102 comprises quadrature amplitude modulation (QAM) modulators 205a and 205b, serial-to-parallel (S-to-P) block 210a, Inverse Fast Fourier Transform (IFFT) blocks 215a and 215b, parallel-to-serial (P-to-S) blocks 220a and 220b, and add cyclic prefix blocks 225a and 225b. At least some of the components in FIG. 2 may be implemented in software while other components may be implemented by configurable hardware or a mixture of software and configurable hardware. In particular, it is noted that the FFT blocks and the IFFT blocks described in FIG. 2 may be implemented as configurable software algorithms, where the values of FFT and IFFT sizes may be modified according to the implementation.

For the purposes of simplicity and clarity, the embodiment in FIG. 2 illustrates only two transmit paths that send data to only two subscriber stations (i.e., SS 116 and SS 115) via only two transmit antennas, ATN1 and ANT2 (not shown). However, this is by way of illustration only and should not be construed to limit the scope of the disclosure. More generally, a base station according to the present disclosure may use N transmit antennas to transmit data to M subscriber stations using selective allocation of different groups of subcarriers to different transmit antennas. Moreover, base station also may employ some form of preceding on the data streams before mapping of the data symbols to physical antennas, thus creating a set of beams or virtual antennas. The principles of the present disclosure in this case apply equally to the beams or virtual antennas as if they are physical antennas.

A first transmit path is directed to antenna ANT1 (not shown) and a second transmit path is directed to antenna ANT2 (not shown). The first transmit path comprises IFFT block 215a, P-to-S block 220a, and add cyclic prefix block 225a. The second transmit path comprises IFFT block 215b, P-to-S block 220b, and add cyclic prefix block 225b. QAM modulator 205a receives a first stream of input symbols to be sent to subscriber station (SS) 116 via both ATN1 and ANT2. QAM modulator 205b receives a second stream of input symbols to be sent to subscriber station (SS) 115 via both ATN1 and ANT2.

QAM modulator 205a modulates the SS 116 symbol stream to produce a first sequence of frequency-domain modulation symbols. S-to-P block 210 selectively maps the first sequence of frequency-domain modulation symbols to selected inputs of IFFT block 215a and to selected inputs of IFFT block 215b. Similarly, QAM modulator 205b modulates the SS 115 symbol stream to produce a second sequence of frequency-domain modulation symbols. S-to-P block 210 selectively maps the second sequence of frequency-domain modulation symbols to selected inputs of IFFT block 215a and to selected inputs of IFFT block 215b.

S-to-P block 210 converts (i.e., de-multiplexes) the serial QAM symbols from QAM modulators 205a and 205b to parallel data to produce N parallel symbol streams where N is the IFFT/FFT size used in BS 102, SS 115, and SS 116. Since the inputs to IFFT block 215a and IFFT block 215b correspond to particular subcarriers on ATN1 and ANT2, respectively, it is the mapping performed by S-to-P block 210 that determines which subcarriers on which antenna carry data for which subscriber station.

In the first transmit path, IFFT block 215a performs an IFFT operation on the N parallel symbol streams received from S-to-P block 210 to produce time-domain output signals. P-to-S block 220a converts (i.e., multiplexes) the parallel time-domain output symbols from IFFT block 215a to produce a serial time-domain signal. Add cyclic prefix block 225a then inserts a cyclic prefix to each OFDM symbol in the time-domain signal. The output of add cyclic prefix block 225a is sent to antenna ATN1 via up-conversion circuitry (not shown).

In the second transmit path, IFFT block 215b performs an IFFT operation on the N parallel symbol streams received from S-to-P block 210 to produce time-domain output signals. P-to-S block 220b converts (i.e., multiplexes) the parallel time-domain output symbols from IFFT block 215a to produce a serial time-domain signal. Add cyclic prefix block 225b then inserts a cyclic prefix to each OFDM symbol in the time-domain signal. The output of add cyclic prefix block 225b is sent to antenna ANT2 via up-conversion circuitry (not shown).

The exemplary transmit paths in BS 102 may be representative of the transmit paths of any one of base stations 101-103, as well as the transmit paths of any one of subscriber stations 111-116. However, since multiple antenna configurations are more common in base stations than in subscriber stations or other mobile devices, for the sake of simplicity and clarity, the descriptions that follow will be directed toward transactions between a base station (e.g., BS 102) that implements multiples transmit paths and two subscriber stations (e.g., SS 116 and SS 115). However, such an exemplary embodiment should not be construed to limit the scope of the present disclosure. It will be appreciated by those skilled in the art that in cases where multiple antennas are implemented in a subscriber station, the transmit paths of both the base station and the subscriber station may be implemented as in shown in FIG. 2.

Figure 3:
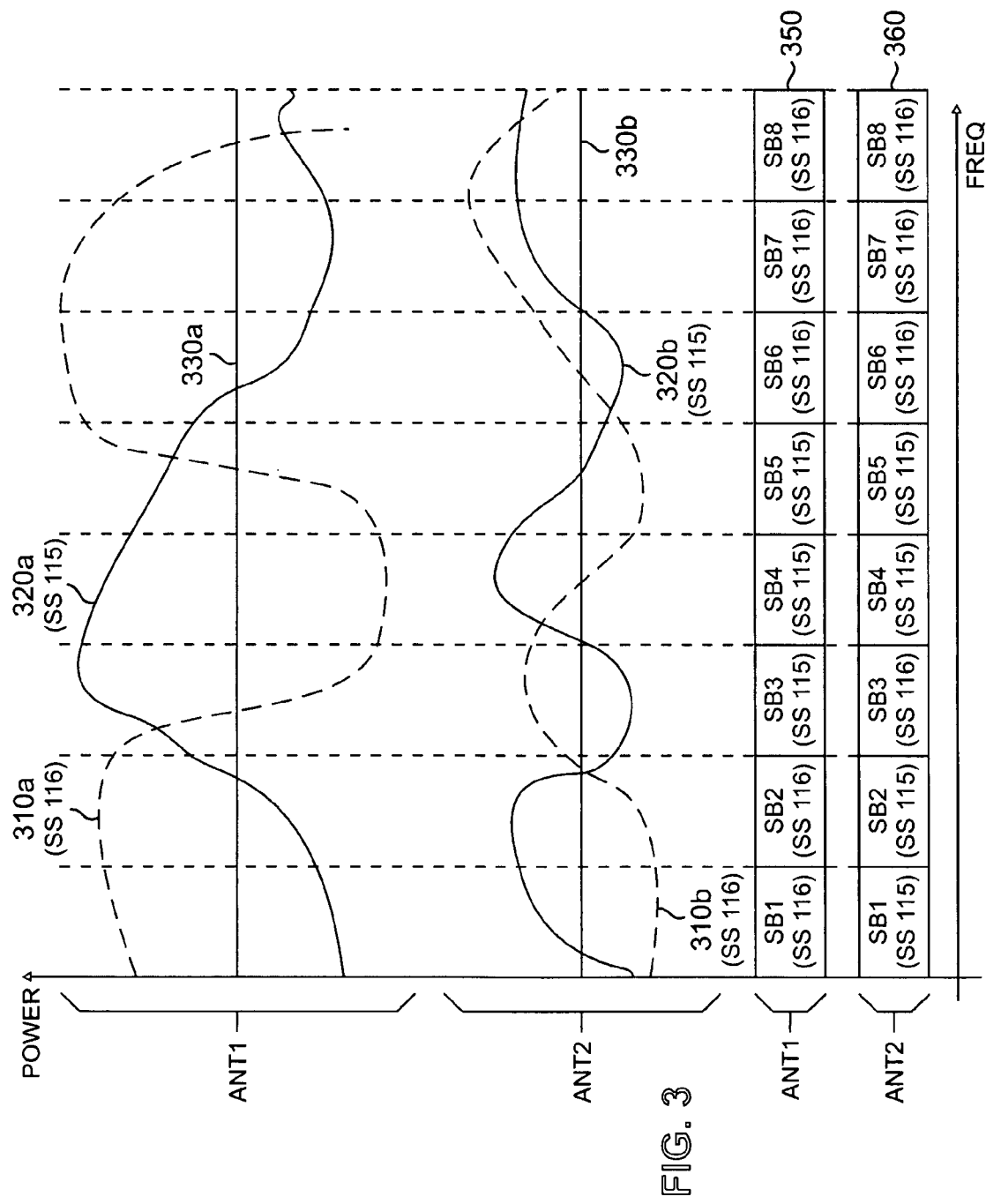
FIG. 3 illustrates the allocation of subcarriers in a wireless network according to the principles of the disclosure.

FIG. 3 illustrates the allocation of subcarriers in wireless network 100 according to the principles of the present disclosure. In this example, a total of 512 OFDM subcarriers (or tones) are divided into 8 groups (or subbands) of 64 contiguous subcarriers (SCs) each. By way of example, the first subband, SB1, contains subcarriers SC1-SC64, the second subband, SB2, contains subcarriers SC65-SC128, and so forth. The eighth (last) subband, SB8, contains subcarriers SC449-SC512.

A given subscriber station (e.g., SS 116 or SS 115) may be allocated one or more of these subbands. In a conventional base station, a MIMO spatial multiplexing antenna array using OFDM allocates the same subband on each transmit antenna to the same subscriber station. Thus, in a conventional base station, if SS 116 is allocated subband SB1 on antenna ATN1, then SS 116 must also be allocated subband SB1 on antenna ANT2.

In FIG. 3, the eight subbands, SB1-SB8, are allocated according to channel fading at the receiver for the case of two transmit antennas, ANT1 and ANT2, and two subscriber stations, SS 115 and SS 116. The received signals at SS 116 and SS 115 from each of the two transmit antennas experience frequency-selective fading due to multipath effects. In case of uncorrelated antennas, the channel qualities from each of transmit antennas ATN1 and ANT2 at SS 115 and SS 116 are independent. Also, the channel from base station (BS) 102 to each of SS 115 and SS 116 is also independent due to the different locations of SS 115 and SS 116 within a cell. Therefore, SS 115 or SS 116 experience independent fading from each of the two transmit antennas as shown in FIG. 3.

Curve 330a represents a flat fading characteristic at antenna ATN1. Dotted-line curve 310a represents the frequency selective fading of the downlink signal from antenna ATN1 seen by the receiver of SS 116. Solid-line curve 320a represents the frequency selective fading of the downlink signal from antenna ATN1 seen by the receiver of SS 115.

Curve 330b represents a flat fading characteristic at antenna ANT2. Dotted-line curve 310b represents the frequency selective fading of the downlink signal from antenna ANT2 seen by the receiver of SS 116. Solid-line curve 320a represents the frequency selective fading of the downlink signal from antenna ANT2 seen by the receiver of SS 115.

A subscriber station is scheduled for transmission on a given subband on a given antenna if its channel quality on that particular subband on for a particular antenna is better than all the other subscriber station in the cell. It is also possible to take other QoS criteria into account when selecting subscriber station for transmission. In the two subscriber station example in FIG. 3, SS 116 is in a relative up-fade on antenna ATN1 compared to SS 115 on subbands SB1, SB2, SB6, SB7 and SB8. Similarly, SS 115 is in a relative up-fade on antenna ATN1 compared to SS 116 on subbands SB3, SB4 and SB5. Thus, the relative fading at antenna ATN1 is used to determine subband allocation 350 for antenna ANT1 near the bottom of FIG. 3.

Likewise, in the two subscriber station example in FIG. 3, SS 116 is in a relative up-fade on antenna ANT2 compared to SS 115 on subbands SB3, SB6, SB7 and SB8. Similarly, SS 115 is in a relative up-fade on antenna ANT2 compared to SS 116 on subbands SB1, SB2, SB4 and SB5. Thus, the relative fading at antenna ANT2 is used to determine subband allocation 360 for antenna ANT2 near the bottom of FIG. 3.

Figure 4:
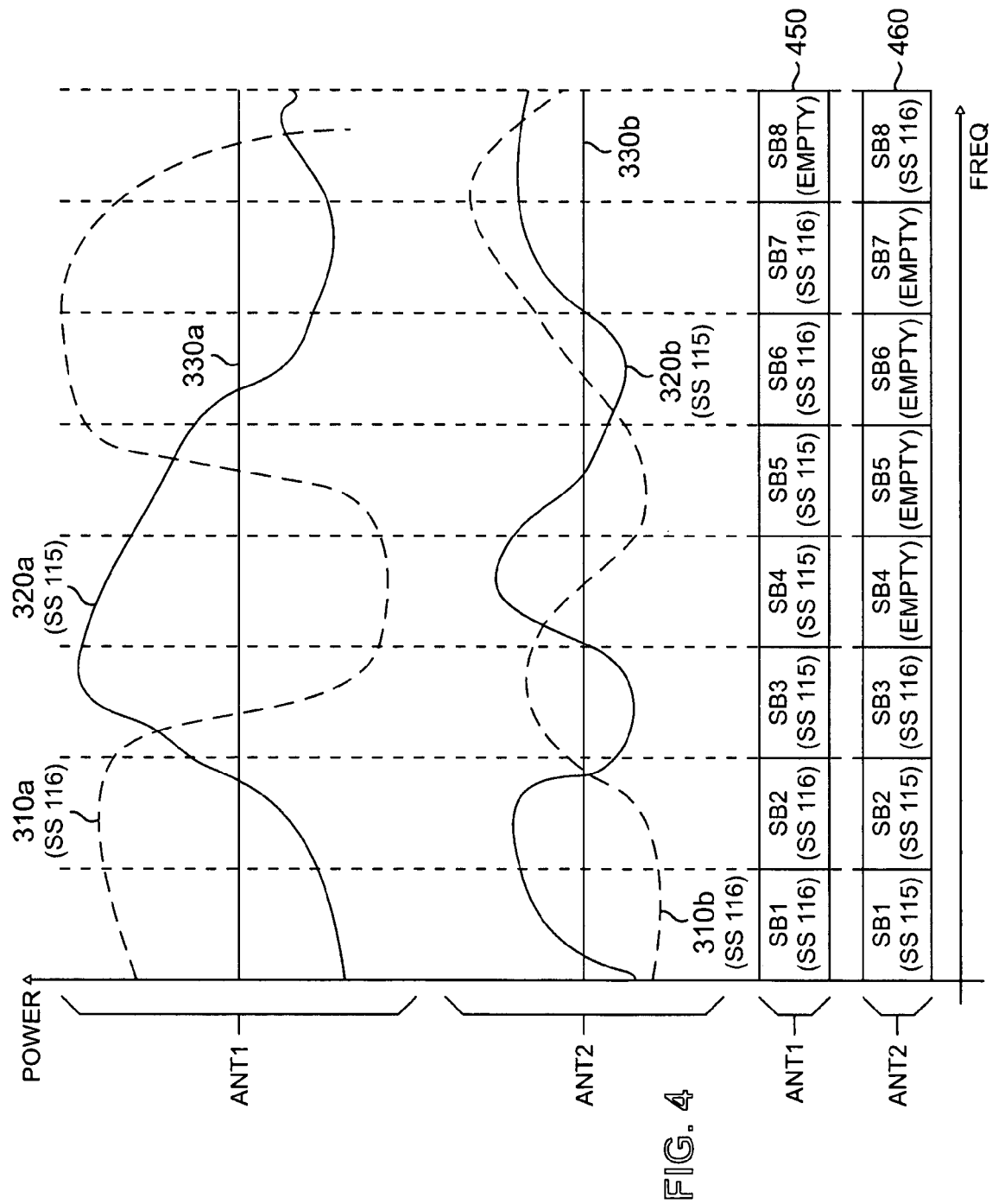
FIG. 4 illustrates an alternate allocation of subcarriers in a wireless network according to the principles of the present disclosure.

FIG. 4 illustrates an alternate allocation of subcarriers in wireless network 100 according to the principles of the present disclosure. In the embodiment in FIG. 4, if a given subscriber station has the best channel fading characteristics in a given subband on both transmit antennas, then only one transmit antenna is used to transmit to that subscriber station on that subband. On the other antenna, that subband is left empty.

From FIG. 3, it is noted that SS 116 had the best fading characteristics on both ANT1 and ANT2 in subbands SB6, SB7 and SB8. It is further noted that SS 115 had the best fading characteristics on both ANT1 and ANT2 in subbands SB4 and SB5. Thus, in FIG. 4, subband SB8 is left empty in subband allocation 450 for antenna ANT1 near the bottom of FIG. 4, and SS 116 receives in subband SB8 only from antenna ANT2. Similarly, subbands SB4, SB5, and SB6 are left empty in subband allocation 460 for antenna ANT2 near the bottom of FIG. 4, and SS 116 receives in subbands SB6 and SB7 only from antenna ATN1 and SS 115 receives in subbands SB4 and SB5 only from antenna ATN1.

Figure 5:
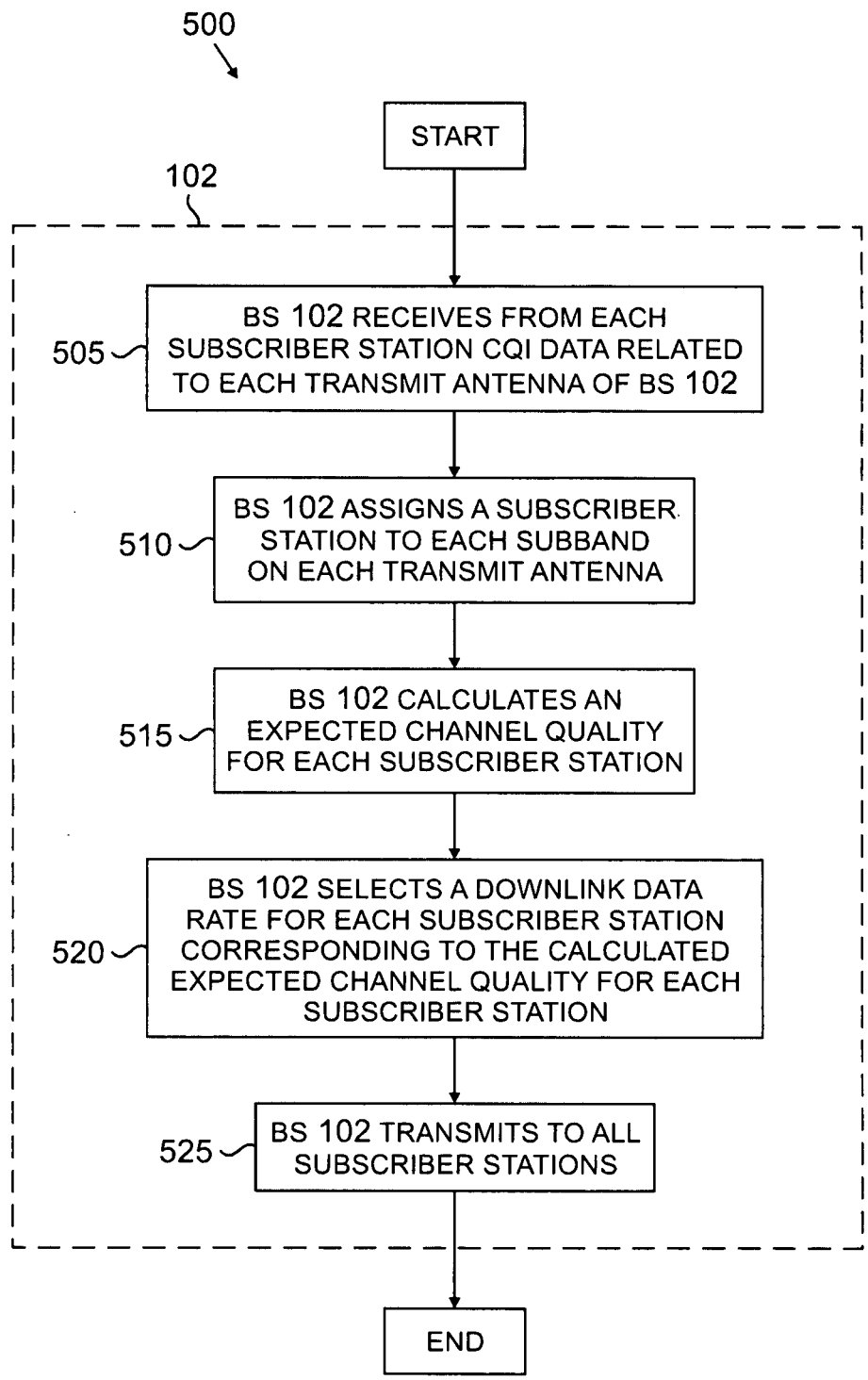
FIG. 5 is a logic flow diagram illustrating subcarrier allocation and data rate selection by a base station according to the principles of the present disclosure.

FIG. 5 depicts logic flow diagram 500, which illustrates subcarrier allocation and data rate selection in base station (BS) 102 according to the principles of the present disclosure. Initially, base station (BS) 102 receives from each of subscriber stations 111-116 channel quality indication (CQI) data related to each transmit antenna of BS 102 (process step 505). Thus, for example, for a two antenna configuration, SS 116 transmits to BS 102 first CQI data for antenna ATN1 and second CQI data for antenna ANT2. This process occurs for all of the other subscriber stations. Based on the received CQI data for antennas ATN1 and ANT2, BS 102 assigns each of subscriber stations 111-116 to receive on a selected subband from each transmit antenna, as explained above in FIG. 3 and FIG. 4 (process step 510).

Next, BS 102 calculates the expected channel quality for each of the scheduled subscriber stations 111-116, based on the expected interference from transmissions from the other antennas on the same band(s) (process step 515). If a single data block is transmitted to a subscriber station on multiple subbands on multiple antennas, the expected overall channel quality may simply be an average of the expected channel qualities on each of the individual subbands. Depending on the implementation, it is possible to use other known algorithms to determine the overall effective channel quality. Alternatively, subscriber stations may calculate the expected channel quality on each of the antennas by using a suitable interference suppression algorithm, such as LMMSE (Linear Minimum Mean Square Error), along with an interference cancellation algorithm, such as Successive Interference Cancellation (SIC). This channel quality can then be reported back to the base station in the Channel Quality Indication (CQI) message.

BS 102 then selects a downlink data rate for each one of subscriber stations 111-116 that corresponds to the calculated expected channel quality for each subscriber station (process step 520). For example, if BS 102 calculates a relatively high expected channel quality for SS 116, then BS 102 selects a relatively high data rate for transmitting to SS 116. BS 102 then transmits to subscriber stations 111-116 using the selected downlink data rates (process step 525).

Figure 6:
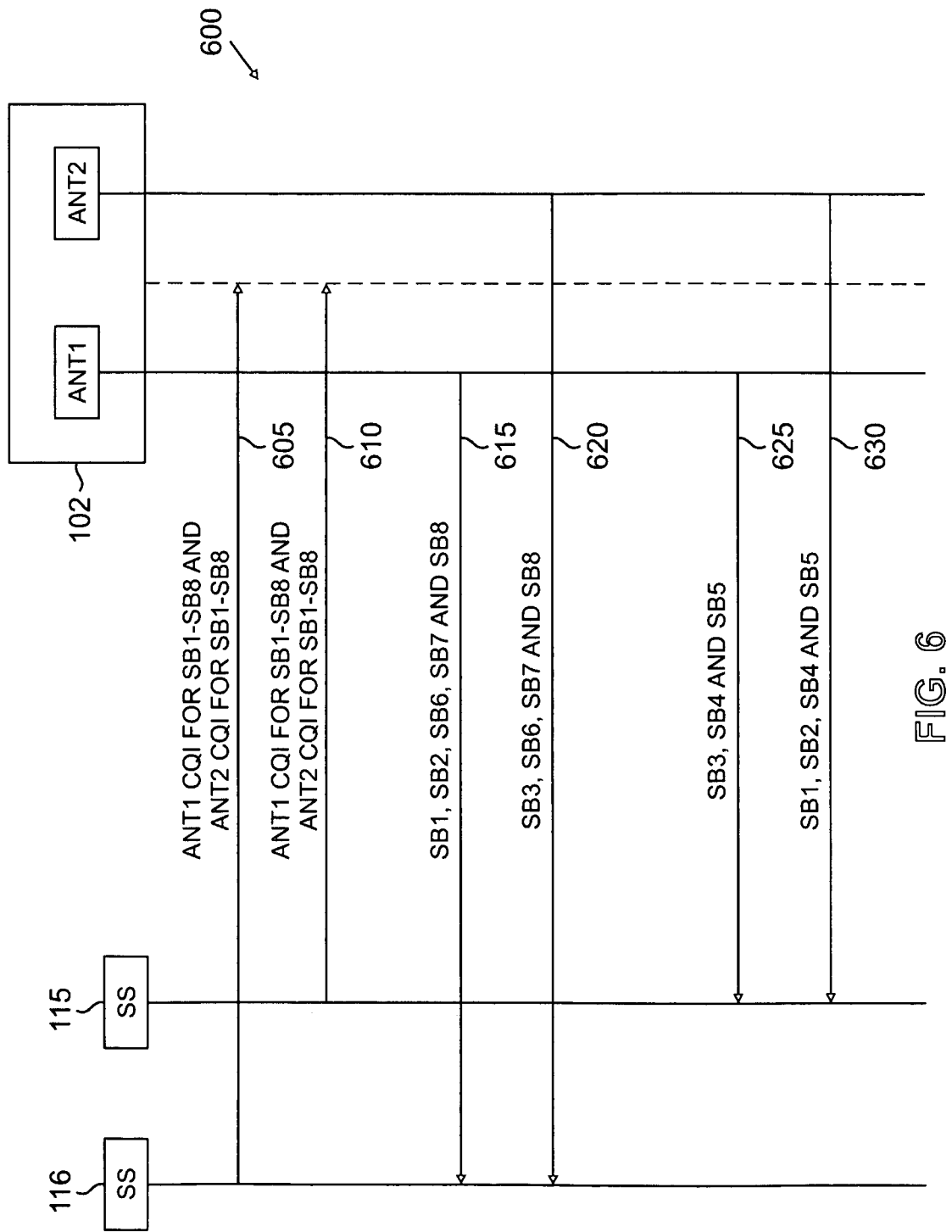
FIG. 6 is a message flow diagram illustrating the allocation of subcarriers in a wireless network according to the principles of the present disclosure.

FIG. 6 depicts message flow diagram 600, which illustrates the allocation of subcarriers in wireless network 100 according to the principles of the present disclosure. In FIG. 6, two subscriber stations, SS 116 and SS 115, report channel quality indication (CQI) data back to base station (BS) 102 for each of the subbands and each of the transmit antennas. Thus, SS 116 transmits to BS 102 control message 605, which contains 1) CQI data for each of subbands SB1-SB8 for antenna ATN1 and 2) CQI data for each of subbands SB1-SB8 for antenna ANT2. Similarly, SS 116 transmits to BS 102 control message 610, which contains 1) CQI data for each of subbands SB1-SB8 for antenna ATN1 and 2) CQI data for each of subbands SB1-SB8 for antenna ANT2. The channel quality indication (CQI) data may be measured based on the reference pilot signal transmitted from each of transmit antennas ATN1 and ANT2.

According to the channel quality observed for each of the subbands on each of the transmit antennas, BS 102 then selects a preferred subscriber station for each of the subbands for each of the transmit antennas, as explained in FIG. 3, for example. Thus, BS 102 transmits user data traffic message 615 to SS 116 from antenna ANT1 for subbands SB1, SB2, SB6, SB7 and SB8. BS 102 also transmits user data traffic message 620 to SS 116 from antenna ANT2 for subbands SB3, SB6, SB7 and SB8. Likewise, BS 102 transmits user data traffic message 625 to SS 115 from antenna ANT2 for subbands SB3, SB4 and SB5. BS 102 also transmits user data traffic message 630 to SS 115 from antenna ANT2 for subbands SB1, SB2, SB4 and SB5.

It is noted that in the first subband, SB1, SS 116 has a better channel gain on antenna ANT1 and SS 115 has a better channel gain on antenna ANT2. Therefore, even if SS 115 is scheduled for transmission in subband SB1 from antenna ANT2 at the same time that SS 116 is scheduled for transmission in subband SB1 from antenna ANT1, only very low interference will occur. If a given subscriber station is better on both transmit antennas in a given subband, both subbands may be allocated to that user, as in FIG. 3. In that case, the two data streams from the two transmit antennas may interfere with each other and interference cancellation may be required in the subscriber station for reliable reception.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A communications system, comprising:
 a base station for use in an orthogonal frequency division multiplexing (OFDM) network, the base station configured to:
 communicate with a first subscriber station in a first subband of subcarriers from a first transmit antenna and communicate with the first subscriber station in a second subband of subcarriers from a second transmit antenna, wherein the first subband from the first transmit antenna and the second subband from the second transmit antenna are each selected independently based on channel quality indication (CQI) data acquired for each subband at each transmit antenna, and wherein the CQI data comprises channel fading characteristics;
 when the first subscriber station has better channel fading characteristics than a second subscriber station in a given subband on both transmit antennas, select one of the two transmit antennas to transmit to the first subscriber station in the given subband and not to transmit in the given subband using the unselected antenna; and determine a data rate for each subband at each transmit antenna based on an expected channel quality for each subband by calculating at least one of: an average of the expected channel qualities on each subband and a Linear Minimum Mean Square Error algorithm with an interference cancellation algorithm.

2. The communications system as set forth in claim 1, wherein the base station is further configured to transmit to the second subscriber station in the first subband of subcarriers from the second transmit antenna.

3. The communications system as set forth in claim 2, wherein the base station is further is configured to transmit to the second subscriber station in the second subband of subcarriers from the first transmit antenna.

4. The communications system as set forth in claim 3, wherein the base station is further configured to receive from each of the first and second subscriber stations: 1) first CQI data associated with a first downlink signal received from the first transmit antenna in the first subband; 2) second CQI data associated with a second downlink signal received from the second transmit antenna in the first subband; 3) third CQI data associated with a third downlink signal received from the first transmit antenna in the second subband; and 4) fourth CQI data associated with a fourth downlink signal received from the second transmit antenna in the second subband.

5. The communications system as set forth in claim 4, wherein the base station is further configured to select the first subscriber station to receive in the first subband from the first transmit antenna and to receive in the second subband from the second transmit antenna, based on the first second, third and fourth CQI data received from the first and second subscriber stations.

6. The communications system as set forth in claim 1, wherein the expected channel quality for each subband is based on an expected interference from transmissions from the other antennas on the same subband.

7. A first wireless communication device for communicating with a second wireless communication device according to an orthogonal frequency division multiplexing (OFDM) protocol, the first wireless communication device configured to:
   transmit to the second wireless communication device in a first subband of subcarriers from a first transmit antenna and transmit to the second wireless communication device in a second subband of subcarriers from a second transmit antenna, wherein the first subband from the first transmit antenna and the second subband from the second transmit antenna are each selected independently based on channel quality indication (CQI) data acquired for each subband at each transmit antenna, and wherein the CQI data comprises channel fading characteristics;
   when the second wireless communication device has better channel fading characteristics than a third wireless communication device in a given subband on both transmit antennas, select one of the two transmit antennas to transmit to the second wireless communication device in the given subband and not to transmit in the given subband using the unselected antenna; and
   determine a data rate for each subband at each transmit antenna based on an expected channel quality for each subband by calculating at least one of: an average of the expected channel qualities on each subband and a Linear Minimum Mean Square Error algorithm with an interference cancellation algorithm.

8. The first wireless communication device as set forth in claim 7, wherein the first wireless communication device is further configured to transmit to the third wireless communication device in the first subband of subcarriers from the second transmit antenna.

9. The first wireless communication device as set forth in claim 8, wherein the first wireless communication device is further configured to transmit to the third wireless communication device in the second subband of subcarriers from the first transmit antenna.

10. The first wireless communication device as set forth in claim 9, wherein the first wireless communication device is further configured to receive from each of the second and third wireless communication devices: 1) first CQI data associated with a first downlink signal received from the first transmit antenna in the first subband; 2) second CQI data associated with a second downlink signal received from the second transmit antenna in the first subband; 3) third CQI data associated with a third downlink signal received from the first transmit antenna in the second subband; and 4) fourth CQI data associated with a fourth downlink signal received from the second transmit antenna in the second subband.

11. The first wireless communication device as set forth in claim 10, wherein the first wireless communication device is further configured to select the second wireless communication device to receive in the first subband from the first transmit antenna and to receive in the second subband from the second transmit antenna, based on the first second, third and fourth CQI data received from the second and third wireless communication devices.

12. The first wireless communication device as set forth in claim 7, wherein the expected channel quality for each subband is based on an expected interference from transmissions from the other antennas on the same subband.

13. The first wireless communication device as set forth in claim 12, wherein the first wireless communication device is a base station of an OFDM wireless network and the second wireless communication device is a subscriber station accessing the OFDM wireless network.

14. For use in an orthogonal frequency division multiplexing (OFDM) network capable of communicating with a plurality of subscriber stations in a coverage area of the OFDM network, a method of transmitting from a base station to a first subscriber station comprising:
   transmitting to the first subscriber station in a first subband of subcarriers from a first transmit antenna;
   transmitting to the first subscriber station in a second subband of subcarriers from a second transmit antenna, wherein the first subband from the first transmit antenna and the second subband from the second transmit antenna are each selected independently based on channel quality indication (CQI) data acquired for each subband at each transmit antenna, wherein the first transmit antenna and the second transmit antenna are used simultaneously, and wherein the CQI data comprises channel fading characteristics;
   when the first subscriber station has better channel fading characteristics than a second subscriber station in a given subband on both transmit antennas, selecting one of the two transmit antennas to transmit to the first subscriber station in the given subband and not transmitting in the given subband using the unselected antenna; and
   determining a data rate for each subband at each transmit antenna based on an expected channel quality for each subband by calculating at least one of an average of the expected channel qualities on each subband, and a Linear Minimum Mean Square Error algorithm with an interference cancellation algorithm.

15. The method as set forth in claim 14, further comprising transmitting to the second subscriber station in the first subband of subcarriers from the second transmit antenna.

16. The method as set forth in claim 15, further comprising transmitting to the second subscriber station in the second subband of subcarriers from the first transmit antenna.

17. The method as set forth in claim 16, further comprising:
receiving in the base station from each of the first and second subscriber stations a first CQI data associated with a first downlink signal received from the first transmit antenna in the first subband;
receiving in the base station from each of the first and second subscriber stations a second CQI data associated with a second downlink signal received from the second transmit antenna in the first subband;
receiving in the base station from each of the first and second subscriber stations a third data associated with a third downlink signal received from the first transmit antenna in the second subband; and
receiving in the base station from each of the first and second subscriber stations a fourth data associated with a fourth downlink signal received from the second transmit antenna in the second subband.

18. The method as set forth in claim 17, further comprising selecting the first subscriber station to receive in the first subband from the first transmit antenna and to receive in the second subband from the second transmit antenna, based on the first second, third and fourth CQI data received from the first and second subscriber stations.

19. The method as set forth in claim 14, wherein the expected channel quality for each subband is based on an expected interference from transmissions from the other antennas on the same subband.

20. An orthogonal frequency division multiplexing (OFDM) network, comprising:
a plurality of base stations capable of communicating with a plurality of subscriber stations in a coverage area of the OFDM network, each base station configured to:
transmit to a first subscriber station in a first subband of subcarriers from a first transmit antenna while simultaneously transmitting to the first subscriber station in a second subband of subcarriers from a second transmit antenna, wherein the first subband from the first transmit antenna and the second subband from the second transmit antenna are each selected independently based on channel quality indication (CQI) data acquired for each subband at each transmit antenna, and wherein the CQI data comprises channel fading characteristics;
when the first subscriber station has better channel fading characteristics than a second subscriber station in a given subband on both transmit antennas at one of the base stations, select one of the two transmit antennas to transmit to the first subscriber station in the given subband and not to transmit in the given subband using the unselected antenna; and
determine a data rate for each subband at each transmit antenna based on an expected channel quality for each subband by calculating at least one of an average of the expected channel qualities on each subband, and a Linear Minimum Mean Square Error algorithm with an interference cancellation algorithm.

21. The OFDM wireless network as set forth in claim 20, wherein the each base station is further configured to transmit to the second subscriber station in the first subband of subcarriers from the second transmit antenna.

22. The OFDM wireless network as set forth in claim 21, wherein the each base station is further configured to transmit to the second subscriber station in the second subband of subcarriers from the first transmit antenna.

23. The OFDM wireless network as set forth in claim 22, wherein the each base station is further configured to receive from each of the first and second subscriber stations: 1) first CQI data associated with a first downlink signal received from the first transmit antenna in the first subband; 2) second CQI data associated with a second downlink signal received from the second transmit antenna in the first subband; 3) third CQI data associated with a third downlink signal received from the first transmit antenna in the second subband; and 4) fourth CQI data associated with a fourth downlink signal received from the second transmit antenna in the second subband.

24. The OFDM wireless network as set forth in claim 23, wherein the each base station is further configured to select the first subscriber station to receive in the first subband from the first transmit antenna and to receive in the second subband from the second transmit antenna, based on the first second, third and fourth CQI data received from the first and second subscriber stations.

25. The OFDM wireless network as set forth in claim 20, wherein the expected channel quality for each subband is based on an expected interference from transmissions from the other antennas on the same subband.

* * * * *